United States Patent

Pomeroy et al.

[15] 3,637,317
[45] Jan. 25, 1972

[54] METHOD AND APPARATUS FOR DRILLING MULTIPLE HOLES

[72] Inventors: Paul E. Pomeroy, 5424 Diane Ave., San Diego, Calif. 92117; Lucia B. Dixon, 8515 Sandstone Drive, Santee, Calif. 92071

[22] Filed: Sept. 2, 1969

[21] Appl. No.: 854,508

[52] U.S. Cl. .................................................. 408/1, 408/47
[51] Int. Cl. ................................... B23b 35/00, B23b 39/16
[58] Field of Search .................. 77/22; 144/110; 145/60.5; 408/1, 47

[56] References Cited

UNITED STATES PATENTS

| 2,253,153 | 8/1941 | Trumble et al. | 77/22 |
| 2,342,251 | 2/1944 | Burt | 77/22 X |

FOREIGN PATENTS OR APPLICATIONS

| 917,525 | 9/1954 | Germany | 77/22 |
| 631,495 | 11/1949 | Great Britain | 77/22 |

*Primary Examiner*—Francis S. Husar
*Attorney*—Carl R. Brown

[57] ABSTRACT

A drilling unit and method of drilling a large number of holes of various sizes in a preset pattern in a single movement of the drilling head. A plurality of drills, each having a crank portion, are driven simultaneously by a common eccentric mechanism. The drills can be very closely spaced and are individually removable and replaceable without disturbing the overall arrangement.

13 Claims, 9 Drawing Figures

INVENTORS
PAUL E. POMEROY
LUCIA B. DIXON
BY
*Carl R. Brown*
ATTORNEY

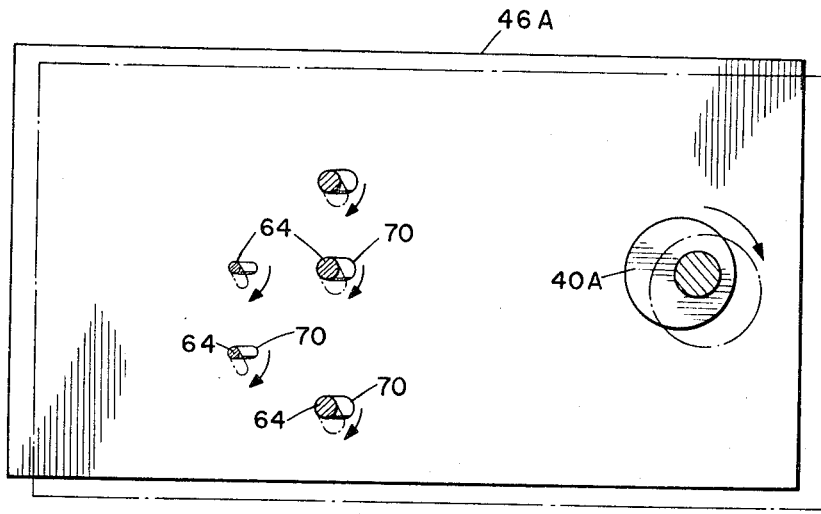
Fig. 5
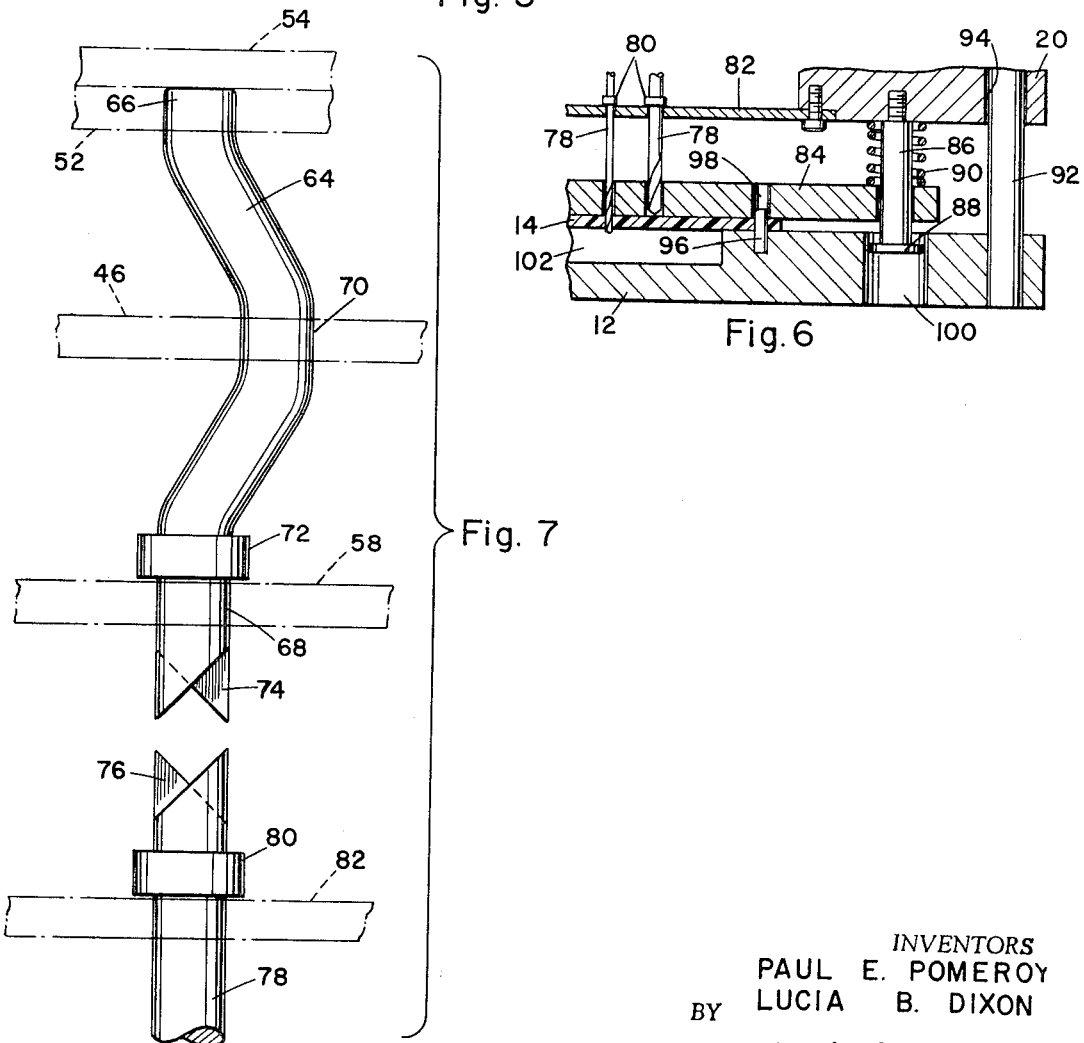
Fig. 6
Fig. 7
INVENTORS
PAUL E. POMEROY
BY LUCIA B. DIXON
ATTORNEY INVENTORS
PAUL E. POMEROY
LUCIA B. DIXON
BY
Carl R. Brown
ATTORNEY

METHOD AND APPARATUS FOR DRILLING MULTIPLE HOLES

BACKGROUND OF THE INVENTION

The present drilling machines consist of single or multiple spindles with a chucking device on the end of each spindle capable of rotating only one drill per spindle. The multiple-spindle drilling machines have a small number of drills in a spaced arrangement limited by the size of chucks or drill-holding means and the drive mechanism. The usual technique in using such drilling machines is to drill a similar hole in each of several workpieces, and then move all the drill units to the next drilling position, by using a pantograph type, numerically controlled indexing machine. This is a time-consuming operation especially for drilling an item such as a printed circuit board with a large number of holes of varied sizes. The precise, repetitive position of the drilled holes as required in printed circuit boards is difficult to accomplish when the drills must be rechucked at each change of hole size. Multiple-spindle drills which will drill several holes of different sizes in a single part have complex drive mechanisms and the proximity and pattern of the drilled holes is limited by the chuck diameter and gear center distances in the drive mechanism. Each change of drill size requires rechucking of the drills which result in small, undeterminable and highly undesirable deviations from optimum hole spacing.

SUMMARY OF THE INVENTION

The drilling unit described herein can be set up with a large number of drills in any desired pattern and very close drill spacing where necessary. Various sizes of drills can be included in any location to provide for complete drilling of a workpiece in a single operation or a single movement of the drill head. Each drill is detachably connected to a crank element and all of the crank elements are rotated simultaneously by a common eccentric mechanism, with the drills held in precise alignment at all times. In a special drilling fixture the drill assembly is lowered on workpieces held in position and the different sizes of drills are stepped in vertical relation to penetrate the workpiece in succession. Thus, if the drill sizes differ sufficiently to require a speed change, this can be made as one size of drill completes penetration and the next size starts. The operation lends itself well to automated techniques, control being primarily the timed, or drill position referenced, changes in drive speed. Individual drills are readily removed or replaced without disturbing the rest of the assembly and, for some types of standardized patterns or parts of these patterns, groups of drills can be removed or inserted to obtain the required arrangement.

While the drilling unit and method of this invention may be used to drill a plurality of small precision holes in close proximity through aluminum or other materials capable of being drilled in one setup or one drilling pass, it has particular application in the drilling of multiple holes in printed circuit boards.

Other objects and many advantages of this invention will become more apparent upon a reading of the following detailed description and an examination of the drawings, wherein like reference numerals designate like parts throughout and in which:

BRIEF DESCRIPTION OF THE DRAWINGS

FIG. 5 is a view showing the basic eccentric drive action;

FIG. 6 is a sectional view similar to a portion of FIG. 3, showing the stepped action of different drill sizes;

FIG. 7 is an enlarged detail of a single drill and driving crank;

DESCRIPTION OF THE PREFERRED EMBODIMENTS

Figure 1:
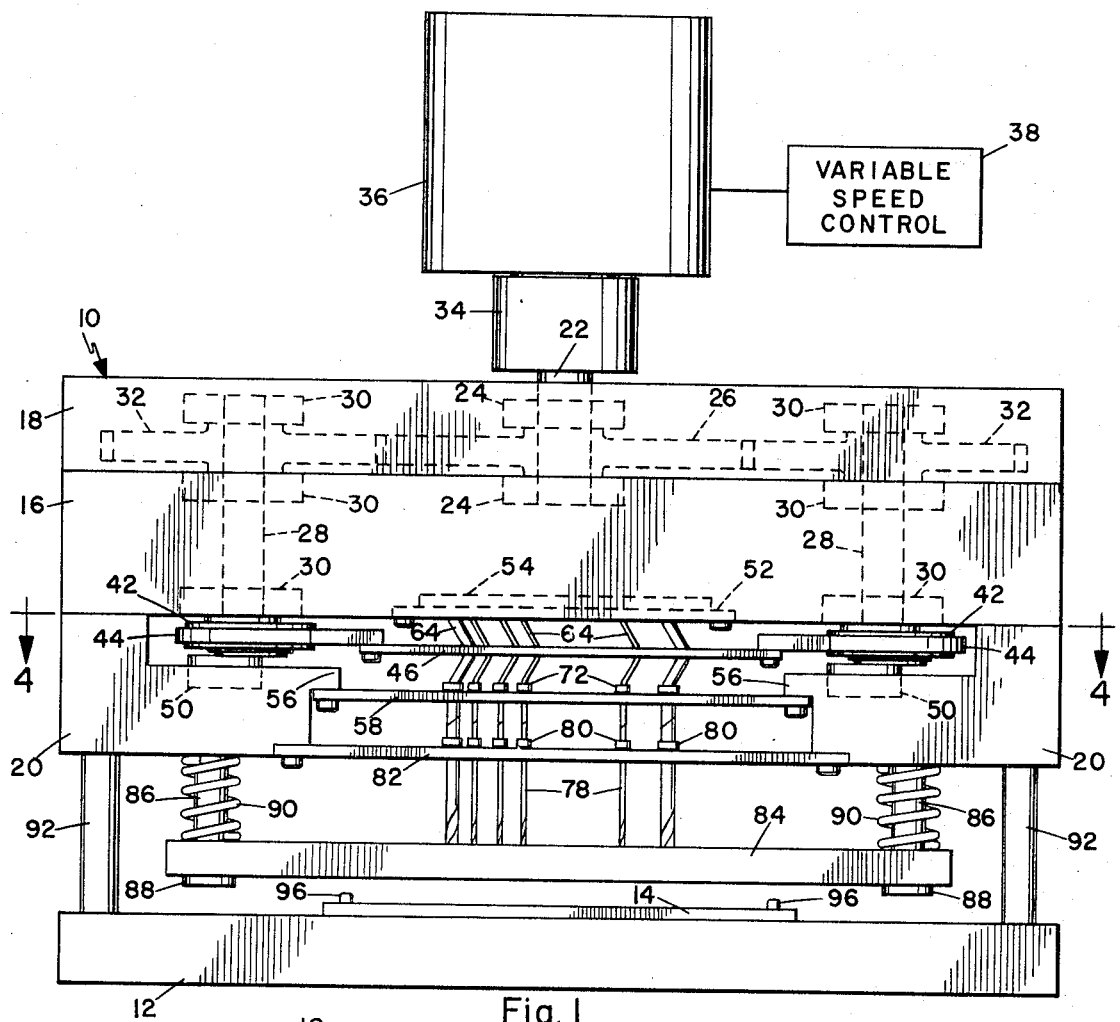
FIG. 1 is a front elevation view of a complete multiple-drill unit.
Figure 2:
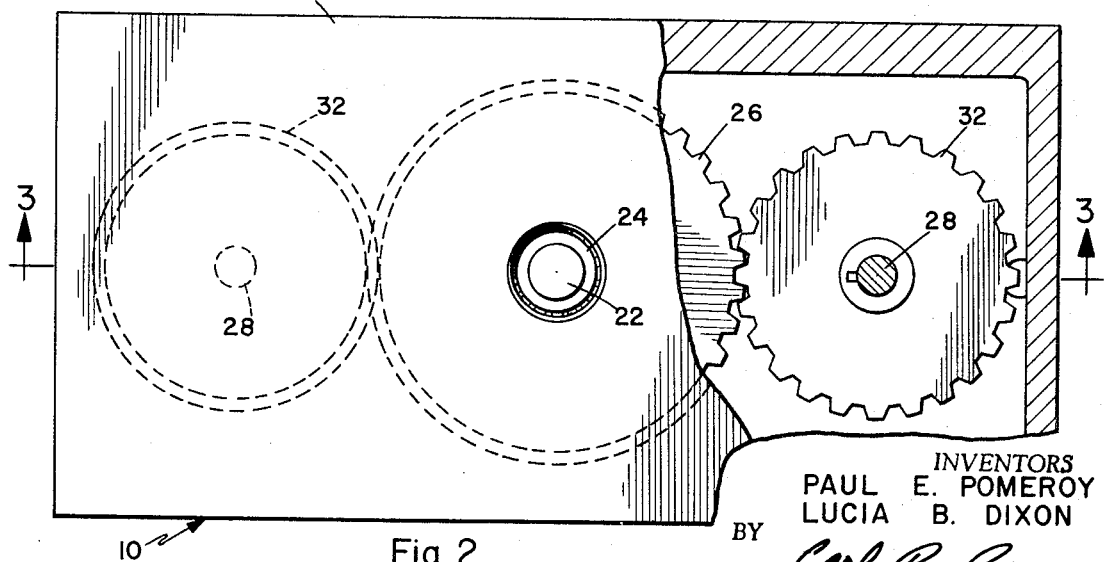
FIG. 2 is a top plan view of the unit with part of the top cover cut away.

In the form shown in FIGS. 1 through 4, the structure includes a drill head 10 which carries the drills and actuating mechanism, and a base or bedplate 12 on which the workpiece 14 is mounted. Head 10 comprises a thick platelike frame 16 with a top cover 18 and lower frame elements 20 fixed thereon in an integral assembly. Substantially at the center of head 10 is a vertical drive shaft 22 journaled in bearings 24 in the frame 16 and cover 18, said drive shaft carrying a drive gear 26. On opposite sides of the drive shaft and parallel thereto are two driven shafts 28 journaled in bearings 30 in the frame end cover, each driven shaft carrying a driven gear 32 meshing with drive gear 26. The gear mechanism is contained within top cover 18 and can be arranged as necessary with a suitable gear ratio to drive both driven shafts 28 in the same direction at the same speed. Drive shaft 22 is coupled to a chuck 34, or similar attachment, of a motor 36, which is provided with suitable speed control means 38 of conventional type. Any convenient supporting means may be used to hold the motor and drill head. For example, the unit could be mounted on and powered by a drill press, which would provide the necessary vertical motion of the head.

At the lower end of each driven shaft 28 is an eccentric boss 40 which is secured in the center of a bearing 42, and fixed on the outside of the bearing is a horizontally extending attachment plate 44. Secured to and between the attachment plates 44 is a flat drive plate 46, which is given an orbital-type motion when the eccentrics rotate. Each driven shaft 28 has an extended pin portion 48 at the lower end, on which is secured a counterweight 50 to balance the eccentric mass and minimize vibration in operation.

Figure 4:
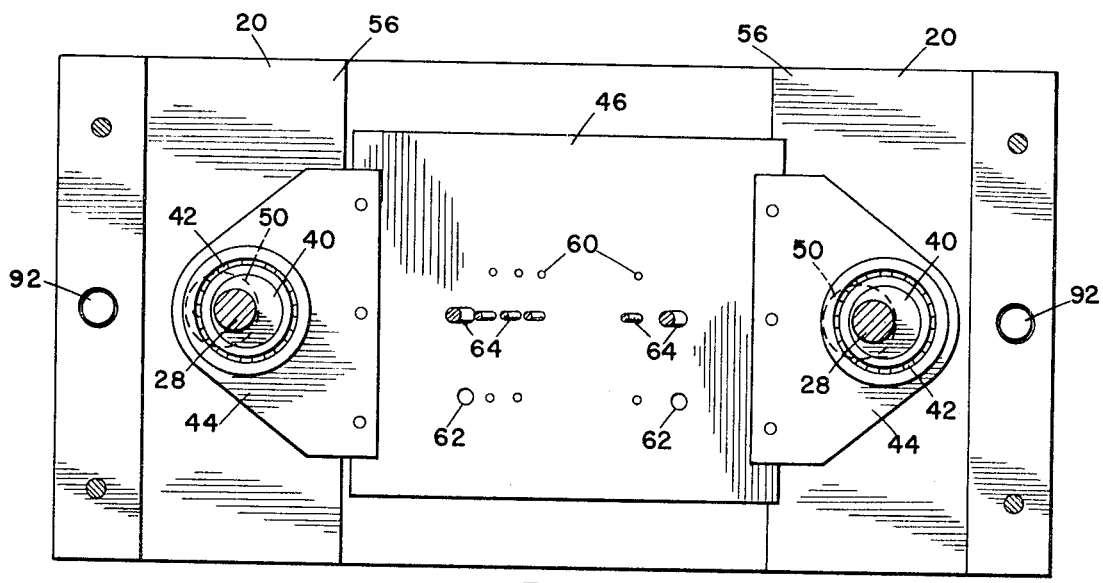
FIG. 4 is a sectional view taken along line 4—4 of FIG. 1.

On the underside of frame 16 is an upper bearing plate 52, above which is a hardened thrust plate 54. These plates are shown recessed in the frame but could be externally mounted. Lower frame elements 20 have inwardly projecting opposed flanges 56, between which is secured a lower bearing plate 58. The drive plate 46 is between and in spaced parallel relation to the upper and lower bearing plates 52 and 58 and all three plates are identically drilled with the pattern and hole sizes to be drilled in the workpiece. In FIG. 4 a few holes 60 and 62 of two sizes are shown as an example. Any number of holes in any arrangement and combination of hole sizes can be used to suit a specific workpiece.

Each drill is driven by a crank element 64, shown in detail in FIG. 7. The upper end 66 of the crank element is held in one hole in the upper bearing plate 52 and the lower end 68 projects downwardly through the lower bearing plate 58, the offset central portion 70 being held in the corresponding hole in drive plate 46. A retaining collar 72 is fixed on lower end 68 above the lower bearing plate to hold the crank element in place with the top against thrust plate 54. The axial displacement or throw of offset portion 70 is equal to the throw of eccentric bosses 40, so that the eccentric orbital action of drive plate 46 causes all the crank elements 64 to rotate equally. The action is shown in two positions in FIG. 5 in a simplified form of structure in which the drive plate 46A is shown as driven directly by an eccentric 40A, for clarity of illustration. The tip of each lower end 68 has a driving dog 74 formed therein to interfit with a corresponding dog 76 on the upper end of a drill bit 78. Other types of connections may be used, but the configuration shown is a simple and convenient connection which does not increase the overall diameter of the junction. Each drill bit 78 has a retaining collar 80 fixed just below the dog 76 and all the drill bits are held in driving connection by a retaining plate 82 drilled with the corresponding hole pattern. The retaining plate 82 is secured to the underside of lower frame elements 20, parallel to lower bearing plate 58. All assembly is made by capscrews or similar means as used in jig and tool construction.

Below the head 10 is a pressure plate 84 which is vertically slidably mounted on posts 86 secured in lower frame elements 20. The lower ends of posts 86 have enlarged heads 88 and the pressure plate is biased downwardly against the heads by load springs 90 concentric with the posts. Pressure plate 84 is also drilled with the complete hole pattern and stabilizes the ends of the drill bits 78.

Bedplate 12 has fixed vertical guide pins 92 at suitable positions to slide in close fitting guide bores 94 in the head 10, and maintain the head in precise alignment over the bedplate. Workpiece 14 is held in place on locating pins 96 projecting upwardly from bedplate 12. Other locating or stop means may be used for workpieces which cannot conveniently be provided with tooling holes to fit the pins. Pressure plate 84 has clearance holes 98 for the locating pins 96 and bedplate 12 has clearance holes 100 for posts 86, when the head is lowered for drilling. Bedplate 12 has a cavity 102 below the workpiece for drill clearance, or could be provided with suitable backing material if the workpiece needs support.

Figure 3:
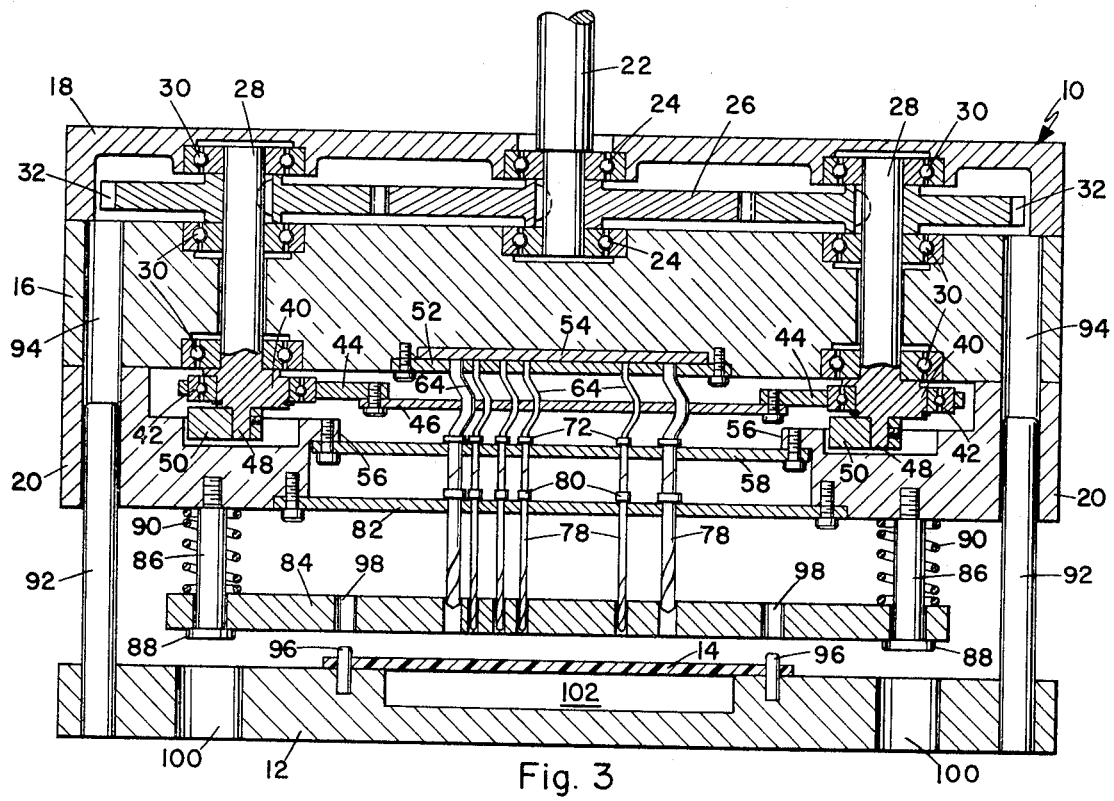
FIG. 3 is a sectional view taken along line 3—3 of FIG. 2.

In FIG. 3, it will be seen that the smaller drill bits extend almost through pressure plate 84, while the larger drill bits are somewhat shorter. When drilling, the smaller drill bits will be completely through the workpiece 14 as the larger drill bits come into contact with the workpiece, as in FIG. 6. This affords an opportunity to change drilling speed to suit the next size of drill bit. With several different sizes of drills, each size would be axially staggered or stepped in this manner if the size change was sufficient to warrant a change in speed, which could be controlled by timing means or drill position sensing means. By such a technique all holes are drilled in one operation of the unit and the sequence of actions is readily adaptable to automatic control. With suitable indexing or positioning means, workpieces could be fed through the unit in interconnected or strip form to speed up production.

Figure 8:
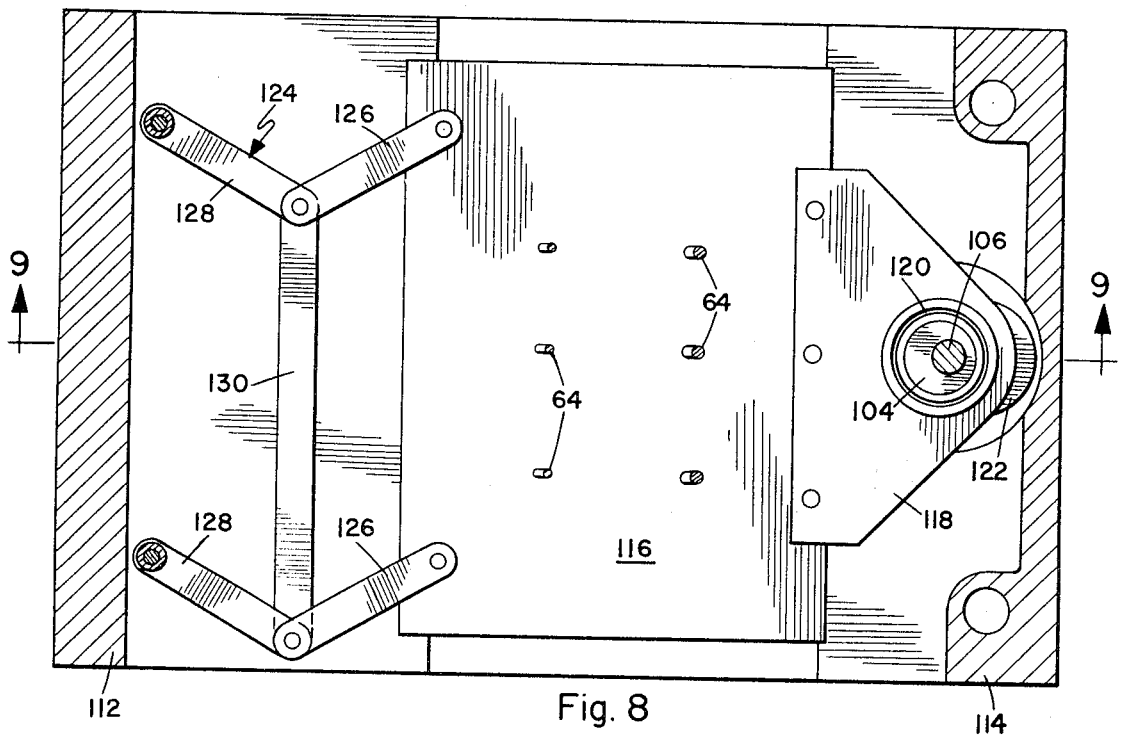
FIG. 8 is a top plan view of a drill unit with an alternative drive mechanism, the top cover being cut away.
Figure 9:
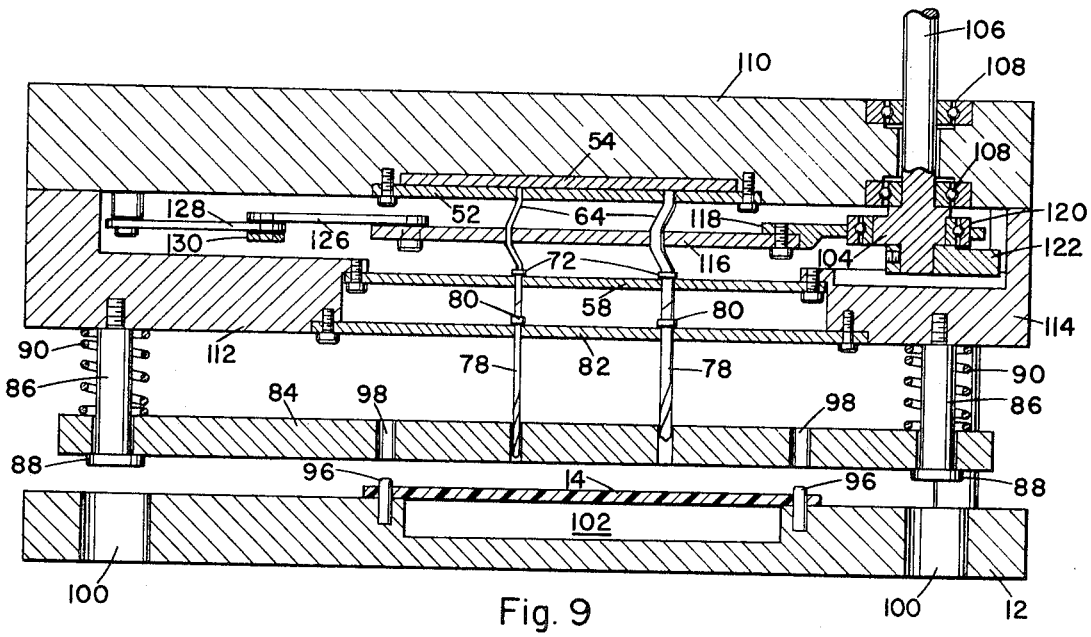
FIG. 9 is a sectional view taken on line 9—9 of FIG. 8.

An alternative form of the eccentric drive mechanism is shown in FIGS. 8 and 9 in which a single eccentric boss 104 is carried directly on a drive shaft 106 journaled in bearings 108 in a head frame 110. Below the frame are lower frame elements 112 and 114, which support a lower bearing plate 58 and retaining plate 82, the upper bearing plate 52 and thrust plate 54 being secured to the underside of the frame in the manner and relationship described above for the head 10. Crank elements 64 and drill bits 78 are also mounted in the same manner and the action is similar to that described. However, the drive plate 116 is secured to a single attachment plate 118 mounted on a bearing 120 around the eccentric boss 104. A counterweight 122 is fixed on the lower end of drive shaft 106 for balancing. The other end of drive plate 116 is attached to and supported by a parallel motion linkage 124 comprising a pair of links 126 pivotally attached to the drive plate, a pair of similar links 128 pivotally connected between links 126 and the lower frame element 112, and a connecting bar 130 interconnecting the junctions of links 126 and 128. The parallel linkage is merely one suitable form and other such means may be used. As the drive plate makes its eccentric orbital motion, the linkage maintains the longitudinal and lateral alignment bearing plates.

The arrangement of the pressure plate, bedplate and workpiece mounting is also as described above and the elements are correspondingly numbered in FIG. 9. Except for the simplified drive means, the operation is the same as that of the geared dual eccentric form of the unit.

The use of crank elements to drive the drills makes it possible to use very close drill spacing. In fact the center to center spacing of adjacent drills may be less than the combined diameters of the drills. Merely enough space to provide working clearance for the retaining collars is all that is required. Normally a matched set of plates, comprising the upper and lower bearing plates 52 and 58, drive plate 46, retaining plate 82 and pressure plate 84 would be made up for each workpiece. For some pieces having a regular hole pattern, or utilizing part of the hole pattern of another, the appropriate drill bits can be inserted in the required pattern. Only the retaining plate 82 need be removed for this operation if the appropriate crank elements are in place, since the crank elements can remain whether or not they are connected to drill bits. Since all holes are drilled in one operation with precisely positioned drills, accuracy is consistent through a large number of drilled parts.

Having described our invention, we now claim:

1. A multiple-hole drilling unit, comprising,
a head having a plurality of drill bits rotatably mounted therein in spaced parallel relation in a present pattern, each of said drill bits having a crank element connected thereto in a driving relation,
a drive element interconnecting all of said crank elements in common alignment,
driven eccentric actuating means coupled to said drive element for moving the drive element with an orbital action corresponding to the throw of said crank elements,
and said drill bits are detachable from said crank elements and have means for retaining said drill bits in said head independently of the crank elements.

2. A multiple-hole drilling unit, comprising,
a head having a plurality of drill bits rotatably mounted therein in spaced parallel relation in a preset pattern, each of said drill bits having a crank element connected thereto in driving relation,
a drive element interconnecting all of said crank elements in common alignment,
driven eccentric actuating means coupled to said drive element for moving the drive element with an orbital action corresponding to the throw of said crank elements,
said head has an upper bearing plate and a lower bearing plate secured thereto in spaced parallel relation,
said crank elements have end portions journaled in said bearing plates,
and said drive element being mounted between the bearing plates.

3. A drilling unit according to claim 2, wherein,
said drive element comprises a drive plate through which said crank elements extend in close-fitting rotational engagement.

4. A drilling unit according to claim 3 and including,
at least one attachment plate to which said drive plate is detachably secured,
said eccentric actuating means including an eccentric boss rotatably mounted in said attachment plate.

5. A drilling unit according to claim 2 wherein,
said crank elements have retaining collars fixed thereon above said lower bearing plate and drill bit driving connections extending below said lower bearing plate.

6. A drilling unit according to claim 5 wherein,
said drill bits have end portions interfitting with said driving connections, and retaining collars fixed thereon below said end portions,
said head having a drill bit retaining plate removably secured thereto and through which said drill bits extend with their retaining collars above the retaining plate.

7. A drilling unit according to claim 6 and including,
pressure plate means vertically, slidably mounted below said head,
and means for biasing said pressure plate means downwardly from said head, said drill bits extending through and being stabilized by said pressure plate means.

8. A drilling unit according to claim 7 and including,
a bedplate having workpiece-aligning means thereon,
said bedplate having guide means engaging said head to guide the head relative to a workpiece,
and said pressure plate means for holding the workpiece in place below the drill bits and during this drilling operation.

9. A drilling unit according to claim 1 wherein,
said actuating means comprises a pair of synchronously driven eccentric elements connected to and supporting said drive element.

10. A drilling unit according to claim 1 wherein, said actuating means comprises an eccentric element connected to one side of said drive element, and parallel motion linkage connected to and supporting the other side of the drive element.

11. A multiple-hole drilling unit, comprising, a head having a plurality of drill bits rotatably mounted therein in spaced parallel relation in a preset pattern, each of said drill bits having a crank element connected thereto in driving relation, a drive element interconnecting all of said crank elements in common alignment, driven eccentric actuating means coupled to said drive element for moving the drive element with an orbital action corresponding to the throw of said crank elements, and said actuating means comprises a pair of synchronously driven eccentric elements connected to and supporting said drive element.

12. A multiple-hole drilling unit, comprising, a head having a plurality of drill bits rotatably mounted therein in spaced parallel relation in a preset pattern, each of said drill bits having a crank element connected thereto in driving relation, a drive element interconnecting all of said crank elements in common alignment, driven eccentric actuating means coupled to said drive element for moving the drive element with an orbital action corresponding to the throw of said crank elements, said actuating means comprises an eccentric element connected to one side of said drive element, and parallel motion linkage connected to and supporting the other side of the drive element.

13. The method of drilling multiple holes in a workpiece comprising the steps of, positioning a plurality of drills to drill a given multiple-hole pattern in a workpiece, rotating said plurality of drills by a single drive mechanism, aligning a workpiece to the cutting ends of said drills, moving the cutting ends of said plurality of rotating drills en masse with one downward movement to contact said workpiece and drill holes therein, positioning the cutting ends of groups of different size drills at different distances from the workpiece, and selectively setting the speed of rotation of each of said groups to correspond to the optimum cutting speed for the group upon the cutting ends of each of said groups reaching the position for contacting the work.

* * * * *